(12) United States Patent
Takezawa et al.

(10) Patent No.: US 12,032,220 B2
(45) Date of Patent: Jul. 9, 2024

(54) LENS BARREL AND SHIFT ADJUSTMENT METHOD FOR LENS BARREL

(71) Applicant: Panasonic Intellectual Property Management Co., Ltd., Osaka (JP)

(72) Inventors: Hideyuki Takezawa, Tokyo (JP); Masayuki Takahashi, Kanagawa (JP); Tetsuya Morita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 493 days.

(21) Appl. No.: 17/431,509

(22) PCT Filed: Jan. 30, 2020

(86) PCT No.: PCT/JP2020/003403
§ 371 (c)(1),
(2) Date: Aug. 17, 2021

(87) PCT Pub. No.: WO2020/174995
PCT Pub. Date: Sep. 3, 2020

(65) Prior Publication Data
US 2022/0146779 A1 May 12, 2022

(30) Foreign Application Priority Data
Feb. 28, 2019 (JP) .................. 2019-035875

(51) Int. Cl.
*G02B 7/02* (2021.01)
*G03B 17/14* (2021.01)
(52) U.S. Cl.
CPC ............. *G02B 7/023* (2013.01); *G03B 17/14* (2013.01)
(58) Field of Classification Search
CPC ................... G02B 7/023; G03B 17/14
(Continued)

(56) References Cited

U.S. PATENT DOCUMENTS 4,989,950 A * 2/1991 Nakauchi ............... G02B 7/023
  359/818
7,408,726 B2 * 8/2008 Iikawa ................... G02B 7/023
  359/823
(Continued)

FOREIGN PATENT DOCUMENTS

JP  1-092618 U  6/1989
JP  2006-106312 A  4/2006
(Continued)

OTHER PUBLICATIONS

International Search Report for corresponding Application No. PCT/JP2020/003403, mailed Mar. 3, 2020.
(Continued)

*Primary Examiner* — Thomas K Pham
*Assistant Examiner* — Jennifer A Jones
(74) *Attorney, Agent, or Firm* — Renner, Otto, Boisselle & Sklar, LLP (57) ABSTRACT

A lens barrel includes: a first lens holding frame; a fixed barrel holding the first lens holding frame and including an elongated window provided radially; and a first step-type eccentric roller rotatably fixed to the first lens holding frame. The first step-type eccentric roller includes usable and non-usable regions on a periphery substantially perpendicular to the rotation axis, a distance from a center of the rotation axis to any point within any one of the usable regions is constant, and the distance is different for each of the usable regions, and the first step-type eccentric roller is fixed to the first lens holding frame by rotating the first step-type eccentric roller about the rotation axis, changing an engagement position between one of the usable regions and a side forming the polygonal shape of the elongated window, and moving the lens group parallel to an optical axis to perform shift adjustment.

3 Claims, 9 Drawing Sheets

(58) Field of Classification Search
USPC .......................................................... 359/823
See application file for complete search history.

(56) References Cited

U.S. PATENT DOCUMENTS

| | | | | |
|---|---|---|---|---|
| 8,767,323 | B2 * | 7/2014 | Kashiwaba | ............ G02B 7/022 |
| | | | | 359/826 |
| 9,030,765 | B2 * | 5/2015 | Okada | ...................... G03B 3/10 |
| | | | | 359/823 |
| 10,139,584 | B2 * | 11/2018 | Sasaki | ................... G02B 7/023 |
| 2007/0002468 | A1 | 1/2007 | Iikawa | |

FOREIGN PATENT DOCUMENTS

| | | | | |
|---|---|---|---|---|
| JP | 2006106312 | A | * | 4/2006 |
| JP | 2007-11051 | A | | 1/2007 |
| JP | 2010-191070 | A | | 9/2010 |
| JP | 2010191070 | A | * | 9/2010 |

OTHER PUBLICATIONS

Written Opinion for corresponding Application No. PCT/JP2020/003403, mailed Mar. 3, 2020.

\* cited by examiner

LENS BARREL AND SHIFT ADJUSTMENT METHOD FOR LENS BARREL

TECHNICAL FIELD

The present disclosure relates to a lens barrel including a shift adjustment mechanism using a step-type eccentric roller.

BACKGROUND ART

A conventional lens barrel has been known that is capable of adjusting a lens holding frame to be parallel to the optical axis with respect to a fixed barrel using an adjustment washer (hereafter referred to as shift adjustment).

Patent Literature (PTL) 1 discloses a lens barrel capable of adjusting, using the thickness of an adjustment washer, the position of the lens along the optical axis by an amount same as the adjustment of the position of a holding member along the optical axis.

CITATION LIST

Patent Literature

[PTL 1] Japanese Unexamined Patent Application Publication No. 2006-106312

SUMMARY OF INVENTION

Technical Problem

However, in order to perform the shift adjustment using the adjustment washer, it is necessary to disassemble the lens barrel temporarily, add the adjustment washer, and reassemble the lens barrel. Therefore, there have been challenges, for example, many process steps are required in the working process of the shift adjustment and the cost for performing the adjustment is high.

On the other hand, it is possible to perform the shift adjustment by providing eccentric rollers radially on the lens holding frame, and adjusting the eccentric rollers by the same amount. Such a method does not require disassembling the lens barrel each time the shift adjustment is performed, and the working process is shortened.

Here, the shift adjustment of the lens holding frame using eccentric rollers requires adjusting the eccentricity of each of the eccentric rollers. However, it is impossible to precisely adjust the eccentricity of the eccentric rollers visually. It is necessary to fix the lens barrel with a dedicated jig and make precise adjustments while constantly measuring the parallel state of the lens holding frame using a measuring device. Therefore, there have been challenges of workability, for example, the process for the assembly becomes complex and the cost for the assembly increases.

In view of the above challenges, the present disclosure aims to provide a lens barrel having excellent workability in the shift adjustment of the lens holding frame and including an eccentric roller that is excellent in cost for adjustment.

Solution to Problem

In order to achieve the above, a lens barrel according to the present disclosure includes: a first lens holding frame that holds a lens group including at least one lens; a fixed barrel that holds the first lens holding frame and includes an elongated window provided radially, the elongated window having a polygonal shape; and a first step-type eccentric roller that is rotatable about a rotation axis and fixed to the first lens holding frame. The first step-type eccentric roller includes a plurality of usable regions and a plurality of non-usable regions on a periphery of the first step-type eccentric roller, the periphery being substantially perpendicular to the rotation axis, a distance from a center of the rotation axis to any point within any one of the plurality of usable regions is constant, and the distance from the center of the rotation axis is different for each of the plurality of usable regions, and the first step-type eccentric roller is fixed to the first lens holding frame by rotating the first step-type eccentric roller about the rotation axis, changing an engagement position between one of the plurality of usable regions and a side forming the polygonal shape of the elongated window, and moving the lens group in a direction parallel to an optical axis to perform shift adjustment.

Advantageous Effects of Invention

The aforementioned disclosure provides a lens barrel having excellent workability in shift adjustment of the lens holding frame and being excellent in cost for the adjustment.

DESCRIPTION OF EMBODIMENTS

One or more embodiments for implementing the present disclosure will be described with reference to the appended drawings. Note that the present disclosure is not limited to such embodiments.

Figure 1:
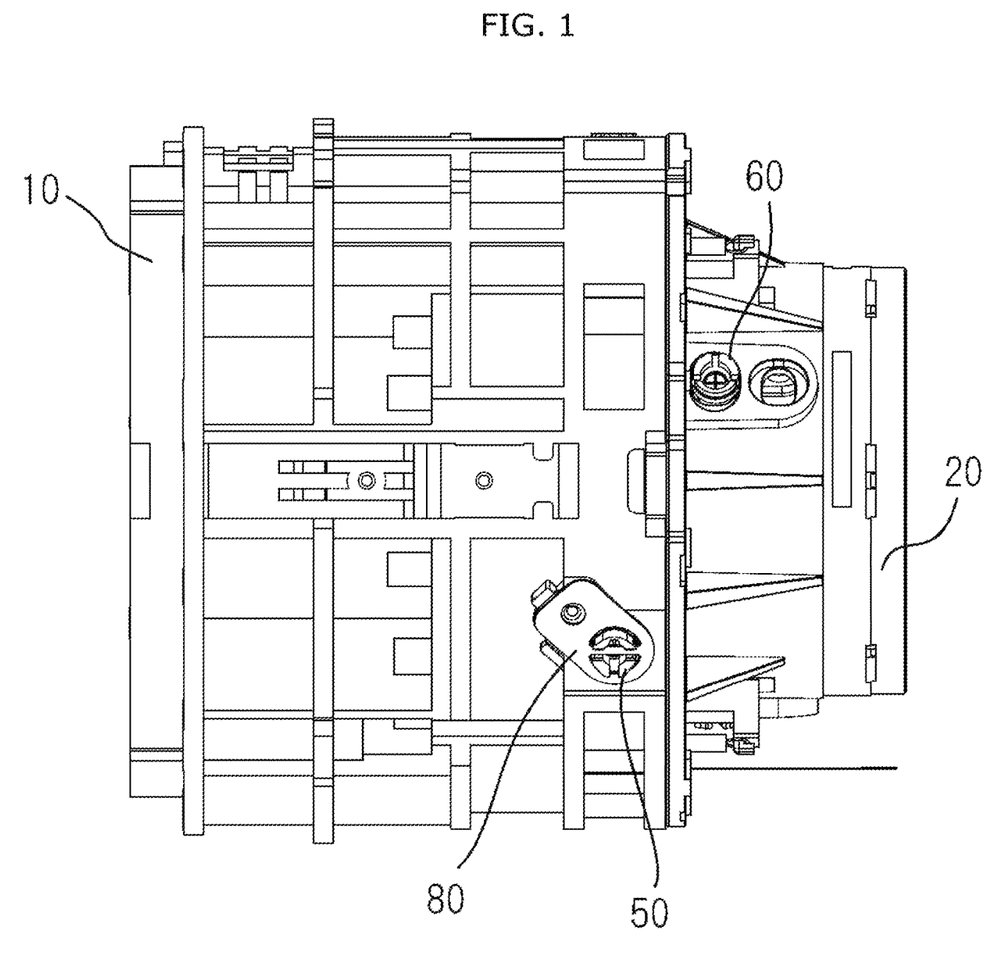
FIG. 1 is a plan view of main components of a lens barrel according to an embodiment of the present disclosure.
Figure 2:
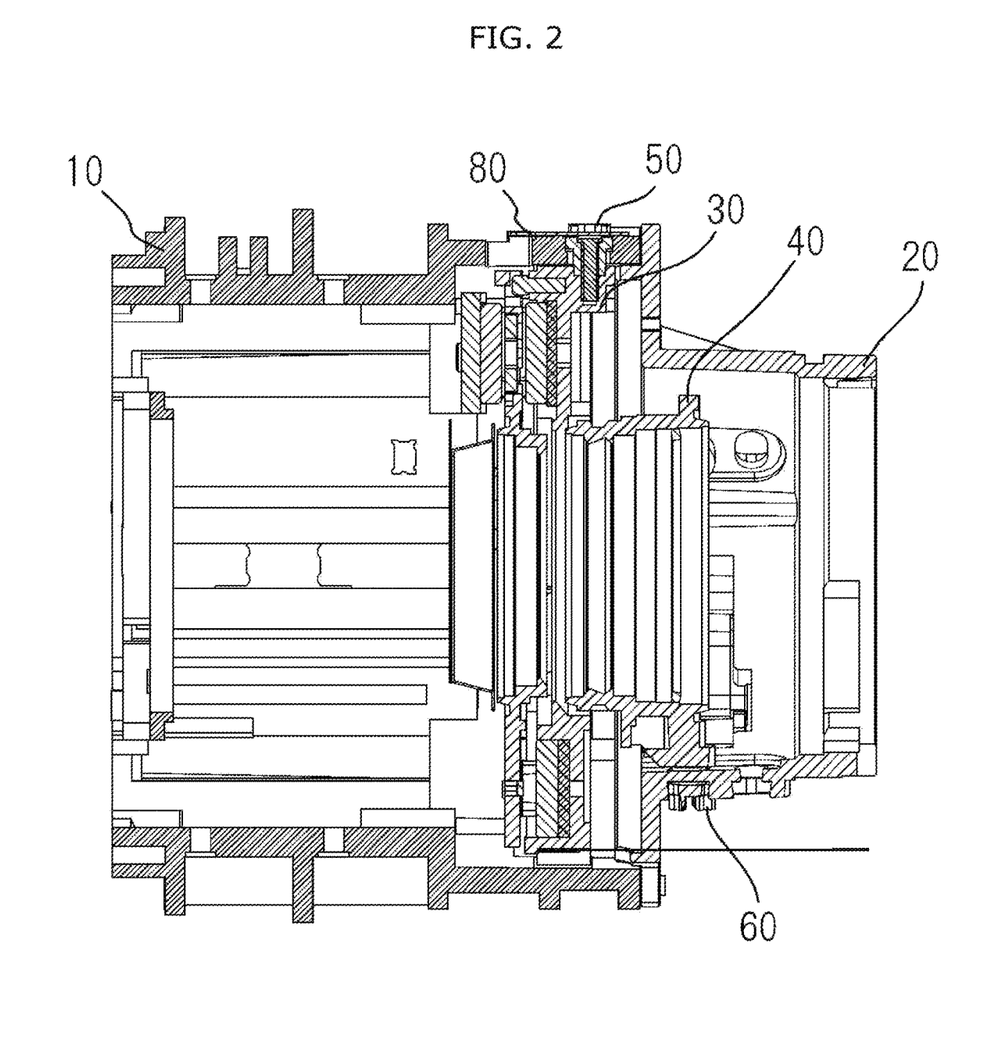
FIG. 2 is a cross-sectional view of the main components of the lens barrel according to an embodiment of the present disclosure.

FIG. 1 is a plan view of main components of a lens barrel according to an embodiment of the present disclosure. FIG. 2 is a cross-sectional view of the main components of the lens barrel according to an embodiment of the present disclosure. The following describes the components of the lens barrel with reference to FIGS. 1 and 2. In the present embodiment, the right side of FIG. 1 is referred to as the image-capturing device side and the opposite side is referred to as the object side.

The lens barrel according to the present embodiment is a device for interchangeably mounting an imaging lens on an image-capturing device, which is not illustrated, via a mounting component. The optical system of the imaging lens has an optical axis on its center. The lens barrel includes: fixed barrel 10, holding barrel 20, first lens holding frame 30, and second lens holding frame 40.

Fixed barrel 10 is a cylindrical component that holds first lens holding frame 30 inside. Fixed barrel 10 includes elongated windows 11 provided radially at three locations and having long sides in the radial direction. Moreover, each of elongated windows 11 includes a horizontal hole, which is a through hole and not illustrated.

First lens holding frame 30 is a lens holding frame capable of performing the shift adjustment along the optical axis with respect to fixed barrel 10. First lens holding frame 30 includes roller reception holes that are provided radially at three locations and into which insertion section 56 of step-type eccentric roller 50 is inserted. The roller reception holes are not illustrated in the drawings.

First lens holding frame 30 is held in fixed barrel 10 when each of three step-type eccentric rollers 50 is engaged and fastened to first lens holding frame 30 through the horizontal hole of elongated window 11 of fixed barrel 10. Insertion section 56 is inserted into the roller reception hole of first lens holding frame 30, and each of step-type eccentric rollers 50 is fastened by fastening component 90 and fixed by fixing component 80 in a state in which step-type eccentric roller 50 cannot be rotated. The shift adjustment for first lens holding frame 30 will be described in detail later.

Holding barrel 20 is a cylindrical component that holds second lens holding frame 40 inside. Holding barrel 20 includes elongated windows each having long sides in the radial direction and provided radially at three locations at equal intervals. Moreover, each of the elongated windows includes a horizontal hole, which is a through hole and not illustrated.

Second lens holding frame 40 is a lens holding frame capable of adjusting a tilt (lens tilt) of holding barrel 20 with respect to the optical axis. Second lens holding frame 40 belongs to the same lens group as first lens holding frame 30. The distance between first lens holding frame 30 and second lens holding frame 40 does not change when focusing or zooming is performed. Second lens holding frame 40 is held in holding barrel 20 when one step-type eccentric roller 50 and two eccentric rollers 60 are fastened to second lens holding frame 40 through the horizontal holes of the elongated windows of holding barrel 20. Insertion section 56 is inserted into the roller receiving hole of second lens holding frame 40, and step-type eccentric roller 50 and eccentric rollers 60 are fastened by fastening component 90. The tilt adjustment for second lens holding frame 40 will be described in detail later.

Figure 3:
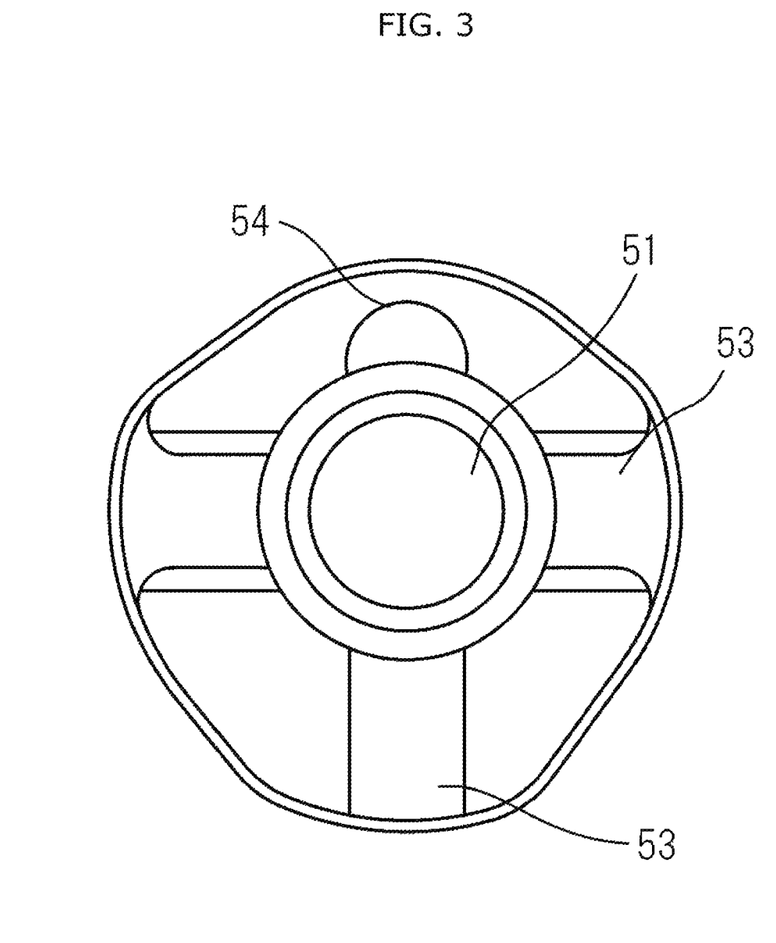
FIG. 3 is a plan view of a step-type eccentric roller according to an embodiment of the present disclosure.
Figure 4:
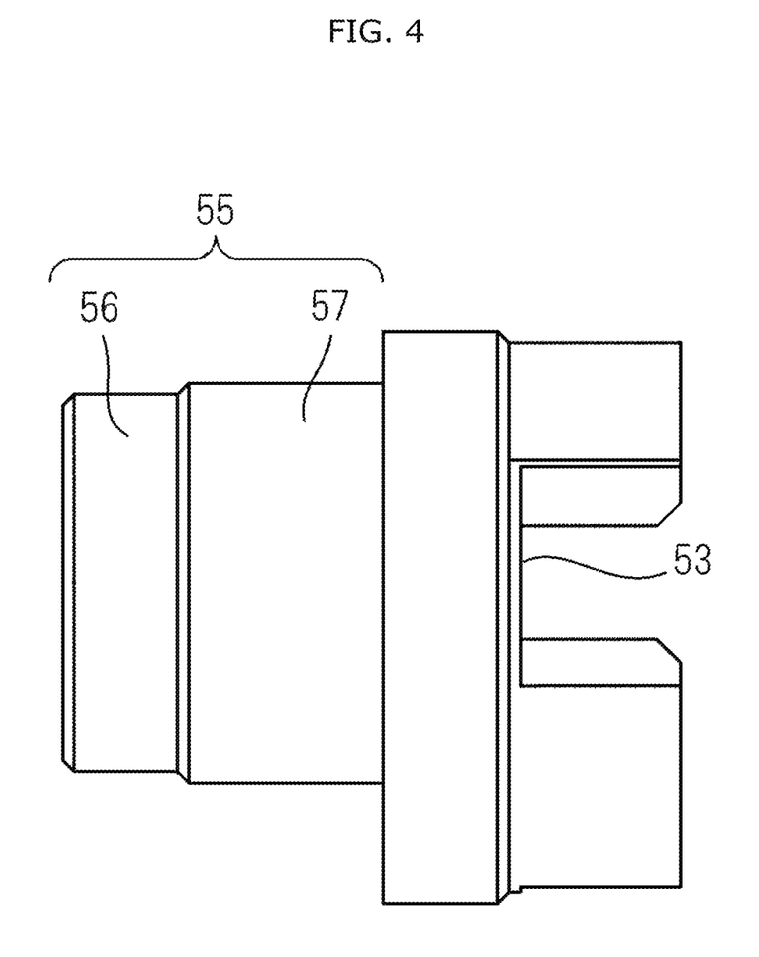
FIG. 4 is a side view of the step-type eccentric roller according to an embodiment of the present disclosure.
Figure 5:
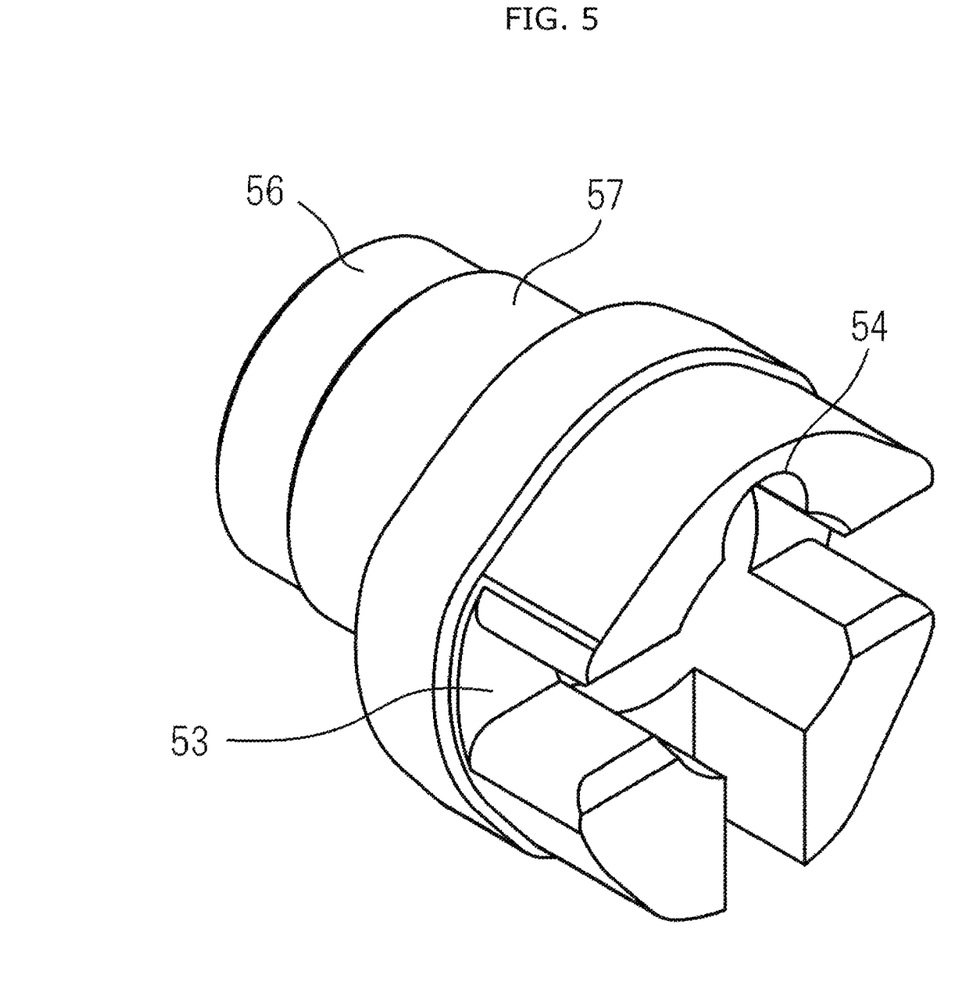
FIG. 5 is a perspective view of the step-type eccentric roller according to an embodiment of the present disclosure.

FIG. 3 is a plan view of step-type eccentric roller 50 according to an embodiment of the present disclosure. FIG. 4 is a side view of step-type eccentric roller 50 according to an embodiment of the present disclosure. FIG. 5 is a perspective view of step-type eccentric roller 50 according to an embodiment of the present disclosure. The following describes step-type eccentric roller 50 with reference to FIGS. 3, 4, and 5.

Step-type eccentric roller 50 is a turbinate component and includes through hole 51 and shaft 55 that are displaced from its center. Through hole 51 is a hole to which fastening component 90 is inserted, and includes a receiving section that abuts the head of fastening component 90. Engagement groove 53 is a groove that engages with fixing component 80 and a jig for rotating step-type eccentric roller 50. Note that engagement groove 53 in the vertical direction does not pass through, and includes abutting section 54. Shaft 55 includes: insertion section 56 that engages with the roller reception section of the lens holding frame; and fitting section 57 that fits to the horizontal holes of elongated windows of fixed barrel 10 and holding barrel 20. In addition, as illustrated in FIG. 3, the periphery portion of step-type eccentric roller 50 does not have a perfect circle shape, unlike a conventional eccentric roller.

Figure 6:
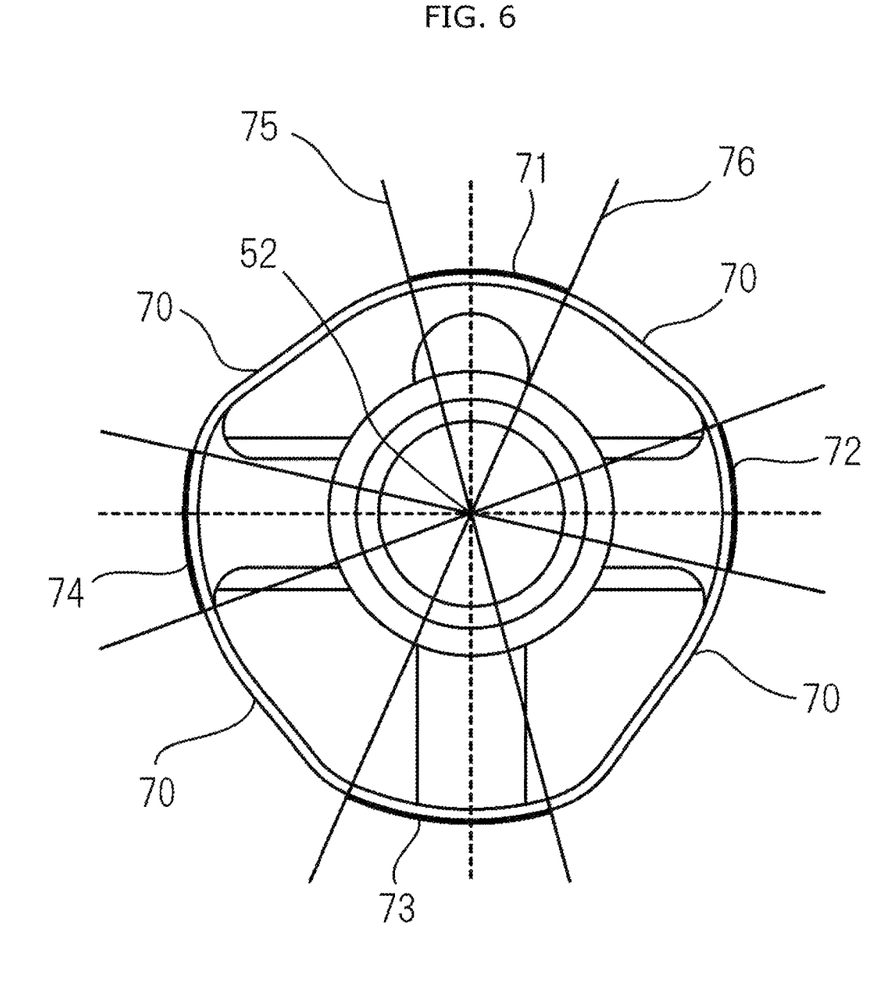
FIG. 6 is a plan view of regions on the periphery of the step-type eccentric roller according to an embodiment of the present disclosure.

FIG. 6 is a plan view of regions on the periphery of step-type eccentric roller 50 according to an embodiment of the present disclosure. Step-type eccentric roller 50 in the present embodiment includes usable regions at four respective locations on the periphery and non-usable regions 70 at four respective locations on the periphery. Usable regions and non-usable regions 70 are illustrated and divided by boundary lines in FIG. 6. Here, the usable region located above through hole 51 in FIG. 6 is referred to as first usable region 71. Clockwise from first usable region 71, usable regions are referred to as second usable region 72, third usable region 73, and fourth usable region 74. Regions other than the usable regions are referred to as non-usable regions 70. Note that in FIG. 6, the dotted lines indicate the horizontal and vertical lines passing through center 52 of the through hole. In addition, each usable region is shown by thick line on the periphery.

The usable regions are regions on the periphery of step-type eccentric roller 50, and the distance from center 52 of through hole to any point within any one of the usable regions is the same. For example, first usable region 71 is a periphery portion of a sector-shaped region and is defined by first boundary line 75 and second boundary line 76 that form a sharp angle. The distance from center 52 of the through hole to any point within first usable region 71 is the same.

Moreover, a specific usable region is paired with another usable region that is located across through hole 51 from the specific usable region, and divided at an equal angle by two common boundary lines. For example, first usable region 71 and third usable region 73 are paired and divided by first boundary line 75 and second boundary line 76 at an equal angle across through hole 51. In addition, two usable regions that are paired form similar sectors.

It is supposed that the distance from center 52 of the through hole to a point in first usable region 71 is a first distance, the distance from center 52 of the through hole to a point in second usable region 72 is a second distance, the distance from center 52 of the through hole to a point in third usable region 73 is a third distance, and the distance from center 52 of the through hole to a point in fourth usable region 74 is a fourth distance. The first, second, third, and fourth distances are different from one another. Consequently, step-type eccentric roller 50 according to the present embodiment has different eccentricities in accordance with each usable region. Details of the eccentricity of step-type eccentric roller 50 will be described later.

In addition, the diameter of step-type eccentric roller 50 that is along a line passing through any point within any one of the usable regions on the periphery and center 52 of the through hole is the same. In other words, the diameter obtained by adding the first distance and the third distance of the paired usable regions is the same as the diameter obtained by adding the second distance and the fourth distance of the paired usable regions. Such a diameter is referred to as a maximum diameter of step-type eccentric roller 50.

Non-usable regions 70 are regions on the periphery, and the distance from center 52 of the through hole to any point within any one of non-usable regions 70 is not the same.

Non-usable regions 70 are adjacent to the usable regions and sandwiched by the usable regions from both sides. Non-usable regions 70 are provided at four respective locations. In addition, the diameter of step-type eccentric roller 50 along a line passing through any point within any one of non-usable regions 70 on the periphery and center 52 of the through hole is less than the maximum diameter of step-type eccentric roller 50.

Next, shift adjustment for the lens barrel including step-type eccentric roller 50 will be described. In the present embodiment, shift adjustment for first lens holding frame 30 with respect to fixed barrel 10 is performed by rotating step-type eccentric rollers 50 that are provided at three locations and engage with first lens holding frame 30.

Figure 7:
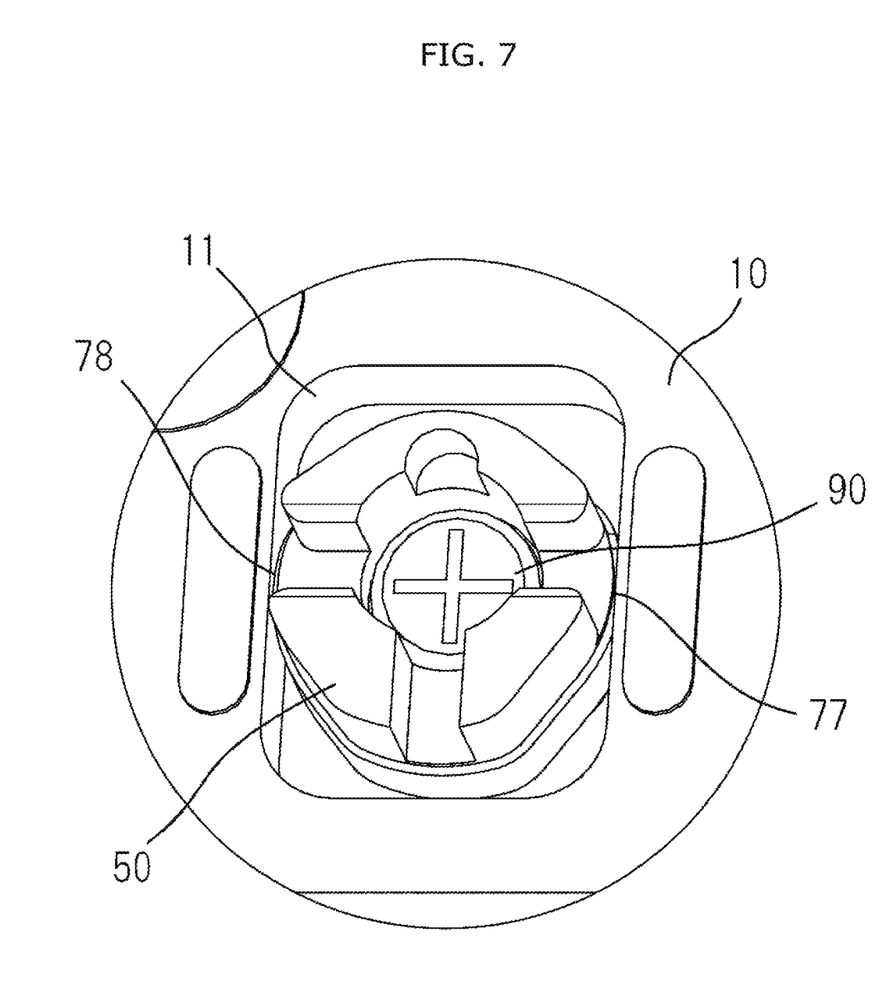
FIG. 7 is a perspective view of a portion where shift adjustment for a lens holding frame is performed according to an embodiment of the present disclosure.

FIG. 7 is a perspective view of a portion where shift adjustment for the lens holding frame is performed according to an embodiment of the present disclosure. Step-type eccentric roller 50 is inserted into the horizontal hole of elongated window 11 of fixed barrel 10. Fitting section 57 is fit into the horizontal hole, and insertion section 56 having a cylinder shape engages with the roller receiving hole of first lens holding frame 30. Also, since the maximum diameter of step-type eccentric roller 50 is substantially the same length as the short sides of elongated window 11, step-type eccentric roller 50 abuts long sides of elongated window 11 at two points along its maximum diameter, thereby restricting the shift movement. Here, in the present embodiment, the abutting point on the image-capturing device side is referred to as first abutting point 77 and the abutting point on the object side is referred to as second abutting point 78. With regard to rotation of the first lens holding frame in the radial direction, movement is restricted by the cylinder-shaped fitting section 57 engaging with the horizontal hole.

When step-type eccentric roller 50 is rotated about center 52 of the through hole, first lens holding frame 30 tilts according to an eccentricity of step-type eccentric roller 50. Therefore, first lens holding frame 30 can be shifted in a given direction by rotating, to an identical state, all step-type eccentric rollers 50 that are radially disposed at three locations.

Figure 8:
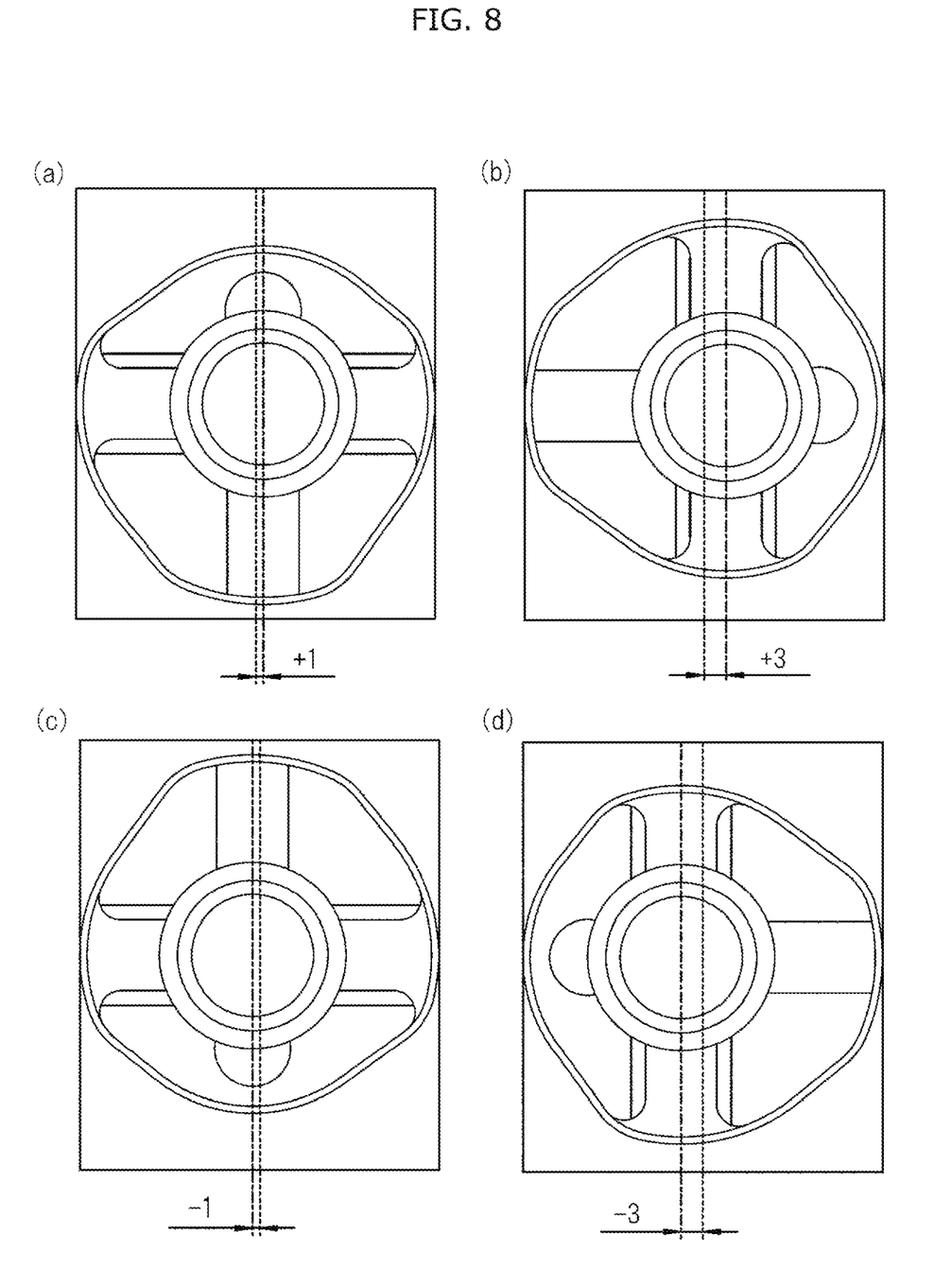
FIG. 8 is a plan view illustrating transition of the state of the step-type eccentric roller according to an embodiment of the present disclosure.

FIG. 8 is a plan view illustrating transition of the state of step-type eccentric roller 50 according to an embodiment of the present disclosure. Step-type eccentric roller 50 has four different states of eccentricities. In FIG. 8, the state illustrated in (a) is referred to as a first state (reference state), the state illustrated in (b) is referred to as a second state, the state illustrated in (c) is referred to as a third state, and the state illustrated in (d) is referred to as a fourth state. In FIG. 8, the vertical solid lines, which abut step-type eccentric roller 50, represent the long sides of elongated window 11, and the horizontal solid lines represent the short sides of elongated window 11. Furthermore, the vertical dotted line is a perpendicular bisector of the horizontal solid lines, and the vertical alternate long and short dash line is a vertical line passing through center 52 of the through hole. Therefore, the horizontal gap between the vertical dotted line and the vertical alternate long and short dash line is the eccentricity of step-type eccentric roller 50 in each state.

In each state, paired usable regions of step-type eccentric roller 50 abut the long sides of elongated window 11. For example, in the first state, second usable region 72 abuts a long side of elongated window 11 at first abutting point 77, and the fourth usable region 74 abuts another long side of elongated window 11 at second abutting point 78. Here, in each state, a distance from center 52 of the through hole to any point within any one of the usable regions is the same, and therefore the position of center 52 of the through hole is the same regardless of where step-type eccentric roller 50 abuts the long sides of elongated window 11. Therefore, in each state, the eccentricity of step-type eccentric roller 50 remains constant, regardless of where paired usable regions abut the long sides of elongated window 11.

Next, transition of the state of step-type eccentric roller 50 to perform shift adjustment will be described. The first state of step-type eccentric roller 50 is the reference state, and the eccentricity in this state is defined as "+1". In the present embodiment, a movement to a plus (+) direction is a movement of first lens holding frame 30 toward the image-capturing device side, and a movement to a minus (−) direction is a movement of first lens holding frame 30 toward the object side.

When step-type eccentric roller 50 in the first state is rotated clockwise, the positions where step-type eccentric roller 50 abuts the long sides of elongated window 11 change within second usable region 72 and fourth usable region 74. When the rotation operation is continued further, second usable region 72 and fourth usable region 74 are released from abutting the long sides of elongated window 11.

As mentioned above, the diameter of step-type eccentric roller 50 is less than the maximum diameter in non-usable regions 70. Therefore, non-usable regions 70 do not abut the long sides of elongated window 11, and step-type eccentric roller 50 is rotated with a space.

When the rotation operation is continued further, third usable region 73 abuts the long side of elongated window 11 at first abutting point 77, and first usable region 71 abuts the other long side of elongated window 11 at second abutting point 78. This state is the second state of step-type eccentric roller 50. In the second state, the eccentricity remains constant at "+3" within the range in which usable regions abut the long sides of elongated window 11.

Subsequently, the rotation operation is performed in the same way, and step-type eccentric roller 50 transitions from the second state to the third state and then to the fourth state, and finally returns to the first state. Here, in the third state, second usable region 72 abuts a long side of elongated window 11 at second abutting point 78, and fourth usable region 74 abuts the other long side of elongated window 11 at first abutting point 77. The eccentricity remains constant at "−1". In the fourth state, third usable region 73 abuts a long side of elongated window 11 at second abutting point 78, and first usable region 71 abuts the other long side of elongated window 11 at first abutting point 77. The eccentricity remains constant at "−3".

The rotation adjustment of step-type eccentric roller 50 has been described above. The shift adjustment is performed by equally rotating step-type eccentric rollers 50 provided at three locations to any one of the states that has an aimed eccentricity. The rotation operation is performed, for example, by engaging a jig with engagement groove 53 of step-type eccentric roller 50. Furthermore, the shift adjustment is performed in a state in which step-type eccentric roller 50 is fastened to first lens holding frame 30 by fastening component 90. Fastening component 90 is tightened with a strength with which step-type eccentric roller 50 is rotatable by the jig and to the degree that does not deviate the positional relationship between fixed barrel 10 and first lens holding frame 30.

Step-type eccentric roller 50 according to the present embodiment differs from a conventional eccentric roller in that step-type eccentric roller 50 always maintains a constant eccentricity in the usable regions in each of the states. Each of step-type eccentric rollers 50 is rotated to a target state to abut elongated window 11 within the usable regions. In this manner, the rotation operation of step-type eccentric rollers 50 can be performed precisely. Therefore, checking the parallel of the lens holding frame with a special jig or measuring device is not required, and visual shift adjustment can be performed easily and precisely.

In the present embodiment, the first state in which the eccentricity is "+1" is the reference state, and the step-type eccentric rollers are set such that adjustment in two steps toward the object side and adjustment in one step toward the image-capturing device side can be performed. However, the present disclosure is not limited to this configuration. For example, if more adjustment is needed toward the image-capturing device side, the reference state may be changed to allow adjustment in one step toward the object side and adjustment in two steps toward the image-capturing device side, and so on, as appropriate for the design.

Figure 9:
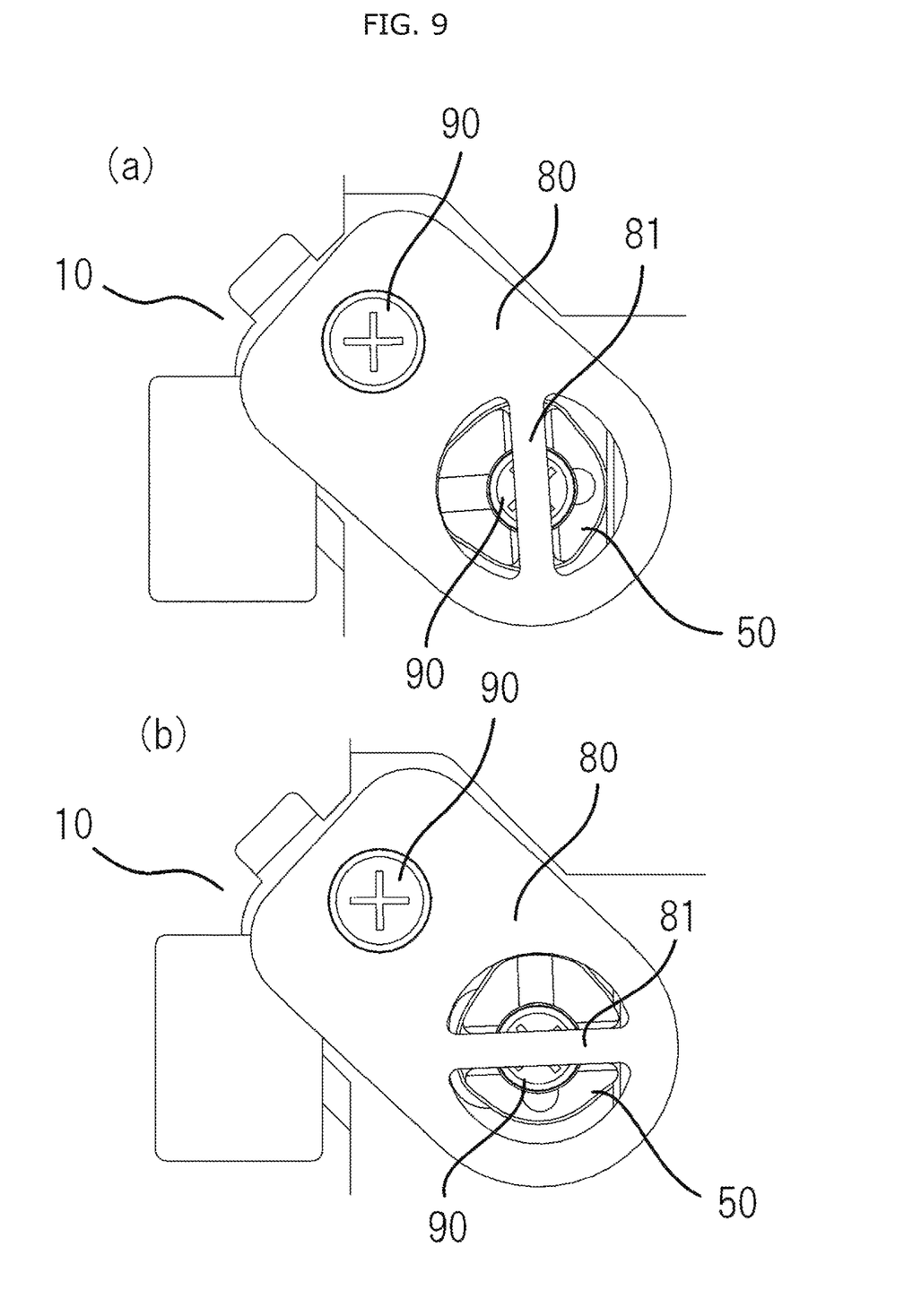
FIG. 9 is a plan view of a fixing component of the step-type eccentric roller according to an embodiment of the present disclosure.

Next, fixing component 80 will be described. FIG. 9 is a plan view of fixing component 80 of step-type eccentric roller 50 according to an embodiment of the present disclosure. Fixing component 80 is a component for further firmly fixing step-type eccentric roller 50 after the shift adjustment is finished, in addition to fastening component 90. Fixing component 80 has a shape including bridge section 81 provided in the central portion of the through hole, and is fastened to fixed barrel 10 by fastening component 90.

In FIG. 9, (a) illustrates a fixing method when the front surface of fixing component 80 is used. When step-type eccentric roller 50 is in the first state or the third state, engagement groove 53 is oriented horizontally. Therefore, the front surface of fixing component 80 is used and bridge section 81 engages with engagement groove 53. In FIG. 9, (b) illustrates a fixing method when the back surface of fixing component 80 is used. When step-type eccentric roller 50 is in the second state or the fourth state, engagement groove 53 is oriented vertically. Therefore, the back surface of fixing component 80 is used and bridge section 81 engages with engagement groove 53.

As described above, fixing component 80 in the present embodiment can be used regardless of the states of step-type eccentric roller 50 by using both surfaces of fixing component 80. Therefore, it is not necessary to prepare a separate fixing component 80 depending on the states of step-type eccentric roller 50. This contributes to simplifying the adjustment process and reducing costs.

Next, tilt adjustment for second lens holding frame 40 will be described. The tilt adjustment for second lens holding frame 40 is performed after the shift adjustment for first lens holding frame 30 is performed. Step-type eccentric roller 50 provided radially at one location and eccentric rollers 60 provided radially at two locations engage with second lens holding frame 40.

When the shift adjustment for first lens holding frame 30 is performed, the distance between first lens holding frame 30 and second lens holding frame 40 changes from the reference state, which is a state in which the shift adjustment is not performed. If the distance between first lens holding frame 30 and second lens holding frame 40 changes, the optical performance of the entire lens barrel changes. Therefore, when the tilt adjustment is to be performed on second lens holding frame 40, the shift adjustment for second lens holding frame 40 is performed at first to make the distance between first lens holding frame 30 and second lens holding frame 40 equal to the distance in the initial state.

The shift adjustment for second lens holding frame 40 is performed by equating the state of step-type eccentric roller 50 provided at one location on second lens holding frame 40 with the state of step-type eccentric rollers 50 on first lens holding frame 30. By equating the states of step-type eccentric rollers 50, second lens holding frame 40 shifts along the optical axis by the same distance as the distance moved by first lens holding frame 30 in the shift adjustment. Therefore, the distance between second lens holding frame 40 and first lens holding frame 30 is the same as the distance in the reference state. Furthermore, the shift adjustment is performed in a state in which step-type eccentric roller 50 is fastened to second lens holding frame 40 by fastening component 90.

Second lens holding frame 40 is then adjusted by adjusting eccentric rollers 60 provided at two locations while the lens group is being measured with a dedicated jig and a measuring instrument, thereby adjusting the tilt of second lens holding frame 40 with respect to holding barrel 20. Eccentric roller 60 on which the tilt adjustment is performed is fastened to second lens holding frame 40 by fastening component 90. Accordingly, tilt adjustment is performed on second lens holding frame 40. Note that, when the shift adjustment for first lens holding frame 30 is not performed, it is sufficient to perform only the tilt adjustment for second lens holding frame 40 with eccentric rollers 60.

As described above, with the present disclosure, shift adjustment can be performed precisely and easily even when the shift adjustment is performed visually by providing step-type eccentric rollers in the lens barrel instead of eccentric rollers. Therefore, the shift adjustment with a simplified adjustment process and reduced costs can be realized.

In addition, the use of the fixing component of the step-type eccentric roller that can be used on both surfaces makes it possible to simplify the adjustment process and reduce costs.

Moreover, the use of step-type eccentric rollers for each lens holding frame makes it possible to adjust the distance between the lens holding frames easily and precisely.

REFERENCE SIGNS LIST 10 fixed barrel
11 elongated window
20 holding barrel
30 first lens holding frame
40 second lens holding frame
50 step-type eccentric roller
51 through hole
52 center of through hole
53 engagement groove
54 abutting section
55 shaft
56 insertion section
57 fitting section
60 eccentric roller
70 non-usable region
71 first usable region
72 second usable region
73 third usable region
74 fourth usable region
75 first boundary line
76 second boundary line
77 first abutting point
78 second abutting point
80 fixing component
81 bridge section
90 fastening component

The invention claimed is:

1. A lens barrel, comprising:
a first lens holding frame that holds a lens group including at least one lens;
a fixed barrel that holds the first lens holding frame and includes an elongated window provided radially, the elongated window having a polygonal shape; and
a first step-type eccentric roller that is rotatable about a rotation axis and fixed to the first lens holding frame, wherein
the first step-type eccentric roller includes a plurality of usable regions and a plurality of non-usable regions on a periphery of the first step-type eccentric roller, the periphery being substantially perpendicular to the rotation axis, a distance from a center of the rotation axis to any point within any one of the plurality of usable regions is constant, and the distance from the center of the rotation axis is different for each of the plurality of usable regions,
among the plurality of the usable regions on the periphery of the first step-type eccentric roller, a specific usable region is paired with an other usable region located across the rotation axis from the specific usable region, a maximum diameter is constant, the maximum diameter being a sum of distances obtained by adding (i) a distance from the rotation axis to any point within the specific usable region and (ii) a distance from the rotation axis to any point within the other usable region that is paired, and a diameter along a line passing through any point within any one of the plurality of non-usable regions and the rotation axis is less than the maximum diameter, and
the first step-type eccentric roller is fixed to the first lens holding frame by rotating the first step-type eccentric roller about the rotation axis, changing an engagement position between one of the plurality of usable regions and a side forming the polygonal shape of the elongated window, and moving the lens group in a direction parallel to an optical axis to perform shift adjustment.

2. The lens barrel according to claim 1, wherein
the plurality of usable regions are provided at four respective locations on the periphery, and the plurality of non-usable regions are provided at four respective locations on the periphery.

3. A shift adjustment method for the lens barrel according to claim 1, the shift adjustment method comprising:
adjusting a plurality of first step-type eccentric rollers by rotating all the plurality of first step-type eccentric rollers to an identical state about the rotation axis, the plurality of first step-type eccentric rollers each being the first step-type eccentric roller; and
fixing each of the plurality of first step-type eccentric rollers by engaging a fixing component with an engagement groove provided in the first step-type eccentric roller.

* * * * *